US006813089B2

(12) United States Patent
Tsutsumi

(10) Patent No.: US 6,813,089 B2
(45) Date of Patent: Nov. 2, 2004

(54) EXTENDER OPTICAL SYSTEM

(75) Inventor: Katsuhisa Tsutsumi, Kawagoe (JP)

(73) Assignee: Fuji Photo Optical Co., Ltd., Saitama (JP)

( * ) Notice: Subject to any disclaimer, the term of this patent is extended or adjusted under 35 U.S.C. 154(b) by 0 days.

(21) Appl. No.: 10/352,239

(22) Filed: Jan. 28, 2003

(65) Prior Publication Data

US 2003/0151827 A1 Aug. 14, 2003

(30) Foreign Application Priority Data

Feb. 7, 2002 (JP) ........................................ 2002-030559

(51) Int. Cl.[7] ............................. G02B 15/02; G02B 9/00
(52) U.S. Cl. ........................................ 359/672; 359/754
(58) Field of Search ................................. 359/672–675, 359/682, 689, 763, 770, 663, 755, 749, 754

(56) References Cited

U.S. PATENT DOCUMENTS 4,810,071 A * 3/1989 Tsuchida et al. ............ 359/675
5,182,671 A * 1/1993 Kitagishi et al. ........... 359/675
6,285,501 B1 * 9/2001 Suzuki ....................... 359/682
6,671,103 B2 * 12/2003 Itoh ........................... 359/689

FOREIGN PATENT DOCUMENTS

| JP | 10-133248 | 5/1998 |
| JP | 11-258489 | 9/1999 |

* cited by examiner

*Primary Examiner*—Georgia Epps
*Assistant Examiner*—Alicia M Harrington
(74) *Attorney, Agent, or Firm*—Arnold International; Bruce Y. Arnold

(57) ABSTRACT

An extender optical system, for insertion between a photographic main lens and a camera body for changing the focal length of the lens system as a whole to the long focus side, is formed of, in order from the object side, a first lens group having negative refractive power, a second lens group formed of a single negative lens, and a third lens group having positive refractive power. The negative lens that constitutes the second lens group is made to move in directions that are normal to the optical axis so as to correct for what would otherwise be blurred images due to vibrations. Various conditions are preferably satisfied so as to ensure high image quality over the entire field of view.

8 Claims, 5 Drawing Sheets

Spherical
Aberration (mm)

Astigmatism (mm)

Distortion (%)

Lateral Color (μm)

Spherical
Aberration (mm)

Astigmatism (mm)

Distortion (%)

Lateral Color (μm)

Spherical
Aberration (mm)

Astigmatism (mm)

Distortion (%)

Lateral Color (μm)

Spherical
Aberration (mm)

Astigmatism (mm)

Distortion (%)

Lateral Color (μm)

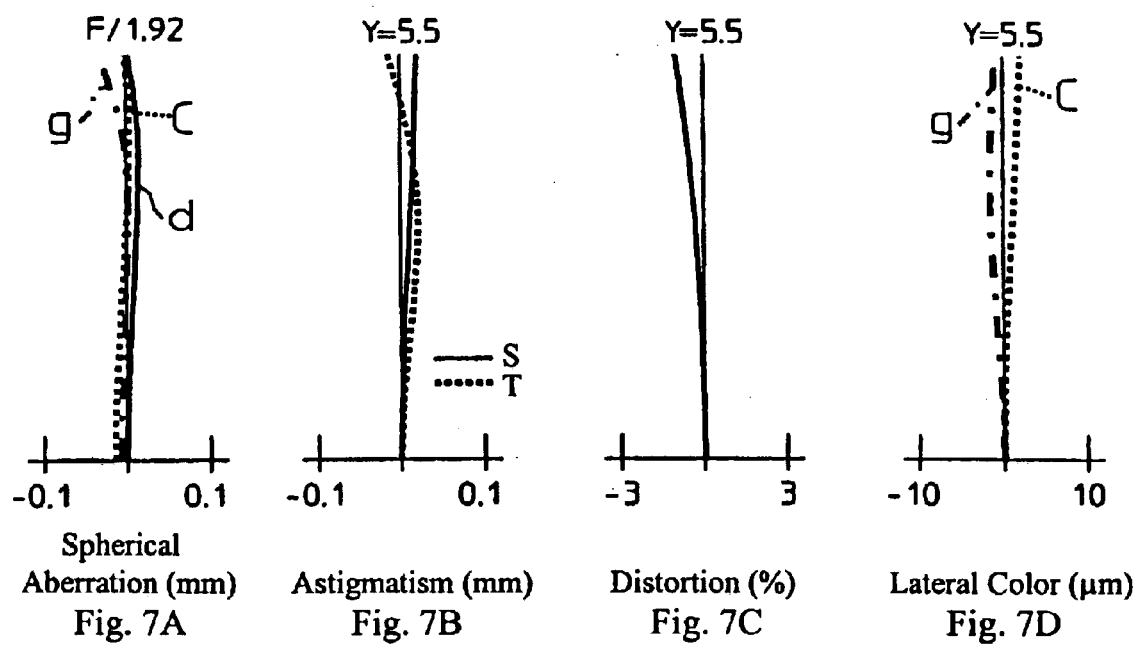

EXTENDER OPTICAL SYSTEM

BACKGROUND OF THE INVENTION

In recent years, the market share of sales of photographic image sensors that are mounted in cameras such as television cameras and video cameras which use charge coupled device (hereinafter CCD) arrays as the image sensor has rapidly increased, and a high resolution over the entire image field has been strongly desired. Hence, photographic lenses for such cameras are required to have a uniformly high optical performance over the entire image field for all photographing conditions.

Meanwhile, numerous extender optical systems have been proposed for insertion between a photographic main lens and a camera body for changing the combined focal length (i.e., with the extender optical system in place) to the long focus side. Such extender optical systems also are required to have a high optical performance so that images are not degraded by use of the extender optical system.

Examples of such extender optical systems are disclosed in Japanese Laid-Open Patent Applications H10-133248, H11-258489 and others. However, in the extender optical systems described above, the reduction of chromatic aberration and lateral color is insufficient at image magnifications of 1.1 or higher. Thus, there is a need for an extender optical system that provides higher quality images, especially images having reduced chromatic aberration and lateral color at magnifications of 1.1 or higher.

Extender optical systems having an anti-vibration mechanism for preventing the blurring of images caused by vibrations (as often occur when a camera is hand-held) are known in the art. For example, the aforementioned laid-open patent applications disclose anti-vibration mechanisms that move the extender optical system as a whole or part of a plurality of lenses as a unit in the direction perpendicular to the optical axis. However, because many lenses are made to move back and forth as a unit, the weight of the objects being driven becomes large, resulting in a bulky driving system.

Moreover, in the prior art of the second laid-open patent application mentioned above, the extender optical system has a structure suitable to a photographic main lens having a relatively long back focus, making it difficult for use in a system with a short back focus, such as a back focus of 40 mm or less.

BRIEF SUMMARY OF THE INVENTION

The present invention is an extender optical system that is suitable for use in television cameras and video cameras, and is to be mounted between a photographic main lens and a camera body in order to change the focal length to the long focus side. In particular, the present invention is an extender optical system that is especially suited for use with television cameras and video cameras that require a relatively long back focus so as to accommodate a color separation optical system within the front stage of the camera main body.

A first feature of the present invention is that it provides an extender optical system that maintains a resolution of the main camera lens by more favorably correcting chromatic aberration and lateral color than in prior art extender optical systems. A second feature of the present invention is that an anti-vibration mechanism can be used without making the drive system bulky. A third feature of the invention is that the extender optical system can be used with a photographic main lens that, by itself, has a rather short back focus.

BRIEF DESCRIPTION OF THE DRAWINGS

The present invention will become more fully understood from the detailed description given below and the accompanying drawings, which are given by way of illustration only and thus are not limitative of the present invention, wherein:

FIGS. 7A–7D show the spherical aberration, astigmatism, distortion, and lateral color, respectively, of a photographic main lens with the extender lens of Embodiment 5 attached.

DETAILED DESCRIPTION

Figure 1:
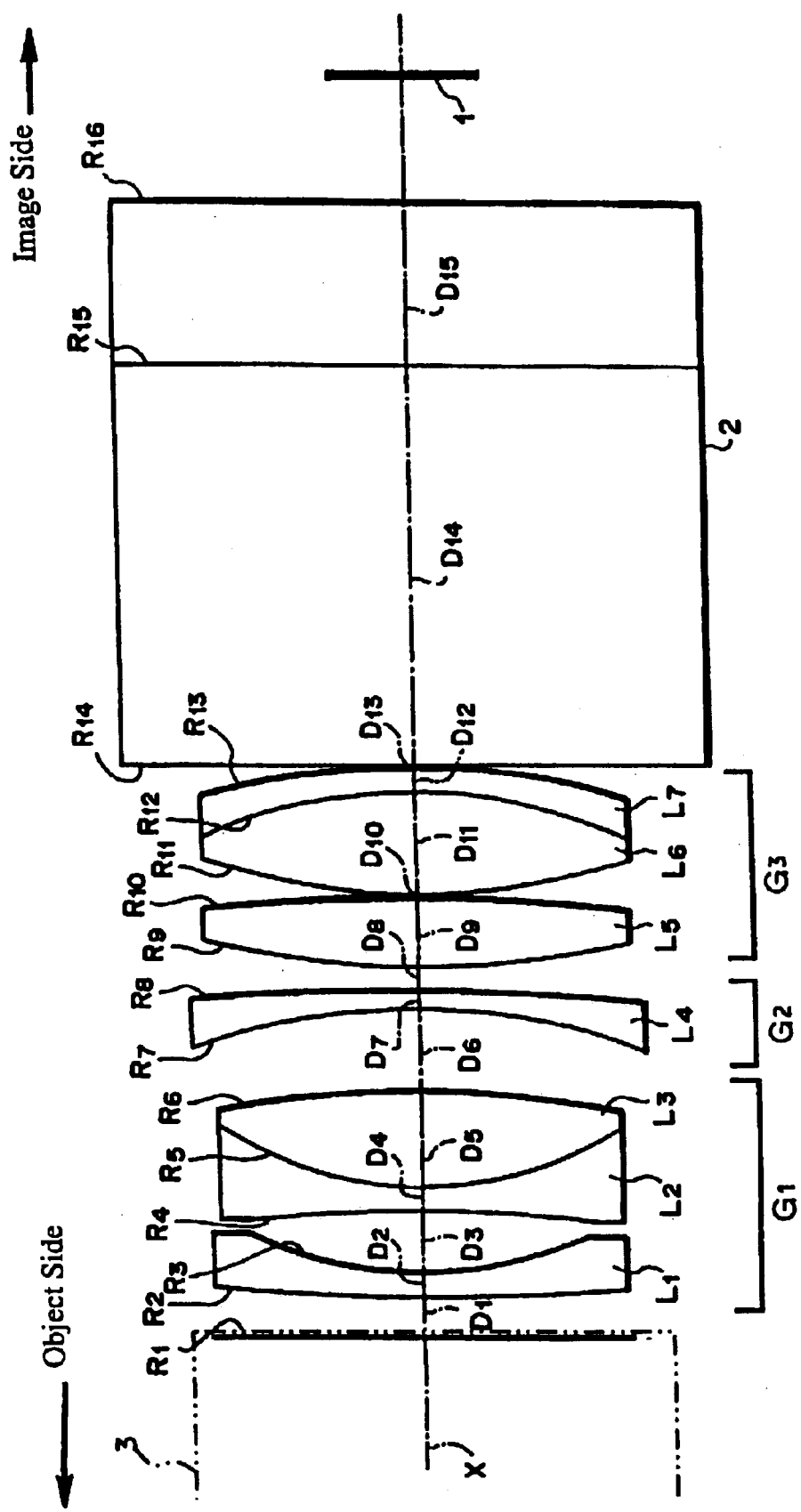
FIG. 1 shows the basic lens element configuration of an extender optical system according to Embodiment 1 of the present invention.

The present invention is an extender optical system for insertion between a photographic main lens and a camera body for changing the focal length of the lens system as a whole to the long focus side. The extender optical system is formed of, in order from a photographic main lens positioned on the object side of the extender optical system: a first lens group of negative refractive power that includes a negative lens element and a positive lens element that are cemented together; a second lens group of negative refractive power that is formed of a single lens element; and a third lens group of positive refractive power that includes a positive lens element and a negative lens element that are cemented together; and wherein the following Conditions (1) and (2) are satisfied:

$$\nu_{1p} \leq 30 \quad \text{Condition (1)}$$

$$\nu_{3p} - \nu_{3n} \geq 38 \quad \text{Condition (2)}$$

where $\nu_{1p}$ is the Abbe number of the positive lens element of the first lens group, $\nu_{3p}$ is the Abbe number of the positive lens element of the cemented component in the third lens group, and $\nu_{3n}$ is the Abbe number of the negative lens element of the cemented component in the third lens group.

Moreover, the first lens group is preferably made by arranging, in order from a photographic main lens positioned on the object side of the extender optical system, a first lens element of negative refractive power, a second lens element of negative refractive power that is cemented to a third lens element of positive refractive power, with the third lens element having surfaces of different curvature, and with its surface of stronger curvature on the object side. The second lens group is preferably made of a fourth lens element of negative refractive power and having surfaces of different curvature, with the surface of stronger curvature being on the object side. The third lens group is preferably made by arranging, in order from the photographic main lens, a fifth lens element which is biconvex, and a cemented lens made of a sixth lens element of positive refractive power that is cemented to a seventh lens element of negative refractive power.

Furthermore, the following Conditions (3) and (4) are, preferably satisfied:

$(N_1+N_2)/2 \geq 1.78$  Condition (3)

$N_6 \leq 1.60$  Condition (4)

where $N_1$ is the refractive index of the first lens element, in order from the photographic main lens, $N_2$ is the refractive index of the second lens element, in order from the photographic main lens, and $N_6$ is the refractive index of the sixth lens element, in order from the photographic main lens.

Moreover, the following Condition (5) is preferably satisfied:

$1.15 \leq \beta \leq 1.60$  Condition (5)

where $\beta$ is an image magnification of the extender optical system.

According to the second feature of the invention, a single negative lens element forms the second lens group and is movable in a direction that is normal to the optical axis in order to correct for what would otherwise be a blurring of images due to vibrations.

Various embodiments of the invention will now be described in detail with reference to the drawings.

Embodiment 1

The extender optical system of Embodiment 1 is intended to be arranged between a photographic main lens 3 and a color separation optical system 2 of a television camera, as illustrated in FIG. 1.

The photographic main lens 3 is a zoom lens that, for example, is formed of many lenses that form a plurality of lens groups, and in which zooming is performed by causing one or more predetermined lens groups to move along the optical axis X while varying the on-axis spacings between lens groups so that light rays are efficiently focused onto an image surface 1.

The extender optical system of Embodiment 1 is formed of, in order from the photographic main lens side (hereinafter termed the "object side"): a first lens group G1 of negative refractive power that is formed of three lens elements L1–L3; a second lens group G2 that is formed of a single negative lens element L4; and a third lens group G3 of positive refractive power that is formed of three lens elements L5–L7.

The first lens group G1 is formed of, in order from the object side, a negative meniscus lens element L1 with its concave surface on the camera body side (hereinafter referred to as the "image side"), a cemented lens made of a biconcave lens element L2 having surfaces of different curvature and with the surface of stronger curvature on the image side cemented to a biconvex lens element L3 having surfaces of different curvature and with the surface of stronger curvature on the object side. The second lens group G2 is formed of a single negative meniscus lens element L4 with is concave surface on the object side. The third lens group G3 is formed of, in order from the object side, a biconvex lens element L5 having surfaces of different curvature with its surface of stronger curvature on the object side and a cemented lens that is made of a biconvex lens element L6 that is cemented to a negative meniscus lens element L7 having its concave surface on the object side.

By forming the second lens group G2 using a single negative lens element, the extender optical system of this embodiment is made compact, enabling it to be used between a photographic main lens having a short back focus and a camera body. Moreover, with the extender optical system of the invention interposed between a photographic main lens and a camera body, a sufficiently long back focus is achieved so as to enable a color separation optical system 2 and various filters to be used. By satisfying Conditions (1) and (2) above, favorable correction of both chromatic aberration and lateral color is obtained.

If Conditions (1) and (2) are not satisfied, the on-axis chromatic aberration of blue light will be excessive when the lateral color is favorably corrected. On the other hand, when the on-axis chromatic aberration of blue light is favorably corrected, the lateral color will be excessive.

Moreover, the system is structured so as to satisfy the above Conditions (3) and (4). By satisfying these conditions, the magnitude of the negative Petzval sum becomes small, resulting in excellent optical performance throughout the entire image field. If Conditions (3) and (4) are not satisfied, the Petzval sum becomes a large negative number, which degrades optical performance at large image angles.

Furthermore, the system according to this embodiment is structured so as to satisfy the above Condition (5). The extender optical system of the present embodiment is structured in such a manner that blurred images caused by a shaky hand, etc., are mitigated by moving a single, negative meniscus lens element L4 (which lens element constitutes the second lens group G2) in directions that are normal to the optical axis so as to stabilize the image. When the above anti-vibration function is provided within the extender optical system as in the present embodiment, and when the image magnification is 1.60 or greater, the F-number of the composite optical system is increased by a factor of at least 1.6 times that of the F-number of the photographic main lens 3, resulting in a rather dark image. In order to avoid this problem, the image magnification is limited to low magnifications in the range 1.15–1.60 (i.e., the range of Condition (5), which makes it possible to employ an anti-vibration function with the extender optical system.

Table 1 below lists the surface number #, in order from the object side (with surface #1 being the image-side surface of the photographic main lens), the radius of curvature R (in mm) of each surface, the on-axis spacing D (in mm) between surfaces, as well as the index of refraction $N_d$ and the Abbe number $v_d$ (both at the d-line) of each optical element of Embodiment 1. Listed in the bottom portion of the table are the image magnification $\beta$ and the back focus Bf in air.

TABLE 1

| # | R | D | $N_d$ | $v_d$ |
|---|---|---|---|---|
| 1 | ∞ | 3.30 | | |
| 2 | 168.602 | 2.00 | 1.83480 | 42.7 |
| 3 | 27.346 | 5.00 | | |
| 4 | −125.914 | 2.00 | 1.83480 | 42.7 |
| 5 | 25.135 | 8.00 | 1.80517 | 25.4 |
| 6 | −71.669 | 6.70 | | |
| 7 | −45.308 | 1.50 | 1.80517 | 25.4 |
| 8 | −195.014 | 2.02 | | |
| 9 | 67.396 | 5.80 | 1.60300 | 65.4 |
| 10 | −131.596 | 0.20 | | |
| 11 | 48.195 | 8.50 | 1.48749 | 70.2 |
| 12 | −34.035 | 2.00 | 1.75519 | 27.5 |
| 13 | −53.946 | 0.00 | | |
| 14 | ∞ | 33.00 | 1.58266 | 46.4 |
| 15 | ∞ | 13.20 | 1.51632 | 64.0 |
| 16 | ∞ | 10.48 | | |

$\beta$ = 1.289
Bf = 40.04 mm

FIGS. 3A–3D show the spherical aberration, astigmatism, distortion, and lateral color, respectively, of a photographic main lens with the extender lens of Embodiment 1 attached.

The spherical aberration is listed for the C, d and g lines, the astigmatism is shown for both the sagittal S and tangential T image surfaces, and the lateral color is shown for the g and C lines (as measured relative to the d-line). The F-number for this embodiment is 1.92 and the maximum image height Y is 5.5 mm. As is apparent from these figures, the various aberrations are favorably corrected for Embodiment 1.

Embodiment 2

The extender optical system of Embodiment 2 is structured essentially the same as that of Embodiment 1, with the only difference being that, in Embodiment 2, the negative lens that forms the second lens group G2 is a biconcave lens having surfaces of different curvature, and with the surface of stronger curvature on the object side.

Table 2 below lists the surface number #, in order from the object side (with surface #1 being the image-side surface of the photographic main lens), the radius of curvature R (in mm) of each surface, the on-axis spacing D (in mm) between surfaces, as well as the index of refraction $N_d$ and the Abbe number $v_d$ (both at the d-line) of each optical element of Embodiment 2. Listed in the bottom portion of the table are the image magnification $\beta$ and the back focus Bf (in air).

TABLE 2

| # | R | D | $N_d$ | $v_d$ |
|---|---|---|---|---|
| 1 | ∞ | 3.30 | | |
| 2 | 145.491 | 2.00 | 1.88299 | 40.7 |
| 3 | 28.469 | 5.00 | | |
| 4 | −149.239 | 2.00 | 1.83400 | 37.1 |
| 5 | 22.601 | 8.00 | 1.80517 | 25.4 |
| 6 | −77.895 | 6.70 | | |
| 7 | −36.860 | 1.50 | 1.88299 | 40.7 |
| 8 | 1040.090 | 2.02 | | |
| 9 | 82.131 | 6.80 | 1.81600 | 46.6 |
| 10 | −51.263 | 0.20 | | |
| 11 | 42.886 | 9.30 | 1.48749 | 70.2 |
| 12 | −37.666 | 2.00 | 1.80809 | 22.8 |
| 13 | −86.908 | 0.00 | | |
| 14 | ∞ | 33.00 | 1.58266 | 46.4 |
| 15 | ∞ | 13.20 | 1.51632 | 64.0 |
| 16 | ∞ | 10.49 | | |

$\beta = 1.294$
Bf = 40.04 mm

FIGS. 4A–4D show the spherical aberration, astigmatism, distortion, and lateral color, respectively, of a photographic main lens with the extender lens of Embodiment 2 attached. The spherical aberration is listed for the C, d and g lines, the astigmatism is shown for both the sagittal S and tangential T image surfaces, and the lateral color is shown for the g and C lines (as measured relative to the d-line). The F-number for this embodiment is 1.92 and the maximum image height Y is 5.5 mm. As is apparent from these figures, the various aberrations are favorably corrected for Embodiment 2.

Embodiment 3

The extender optical system of Embodiment 3 has the same general lens element configuration as the extender optical system of Embodiment 2, however, the details (such as the lens element radii of curvature R, the on-axis spacings D and optical materials that are used) are different.

Table 3 below lists the surface number #, in order from the object side (with surface #1 being the image-side surface of the photographic main lens), the radius of curvature R (in mm) of each surface, the on-axis spacing D (in mm) between surfaces, as well as the index of refraction $N_d$ and the Abbe number $v_d$ (both at the d-line) of each optical element of Embodiment 3. Listed in the bottom portion of the table are the image magnification $\beta$ and the back focus Bf (in air).

TABLE 3

| # | R | D | $N_d$ | $v_d$ |
|---|---|---|---|---|
| 1 | ∞ | 3.30 | | |
| 2 | 135.997 | 2.00 | 1.88299 | 40.7 |
| 3 | 29.301 | 3.83 | | |
| 4 | −399.403 | 2.00 | 1.88299 | 40.7 |
| 5 | 23.107 | 6.66 | 1.80517 | 25.4 |
| 6 | −124.220 | 6.67 | | |
| 7 | −38.954 | 1.50 | 1.83400 | 37.1 |
| 8 | 246.709 | 3.65 | | |
| 9 | 102.576 | 6.56 | 1.78800 | 47.3 |
| 10 | −46.082 | 0.20 | | |
| 11 | 35.886 | 11.07 | 1.48749 | 70.2 |
| 12 | −48.923 | 2.00 | 1.80809 | 22.8 |
| 13 | −140.562 | 0.00 | | |
| 14 | ∞ | 33.00 | 1.58266 | 46.4 |
| 15 | ∞ | 13.20 | 1.51632 | 64.0 |
| 16 | ∞ | 10.49 | | |

$\beta = 1.302$
Bf = 40.04 mm

FIGS. 5A–5D show the spherical aberration, astigmatism, distortion, and lateral color, respectively, of a photographic main lens with the extender lens of Embodiment 3 attached. The spherical aberration is listed for the C, d and g lines, the astigmatism is shown for both the sagittal S and tangential T image surfaces, and the lateral color is shown for the g and C lines (as measured relative to the d-line). The F-number for this embodiment is 2.21 and the maximum image height Y is 5.5 mm. As is apparent from these figures, the various aberrations are favorably corrected for Embodiment 3.

Embodiment 4

Figure 2:
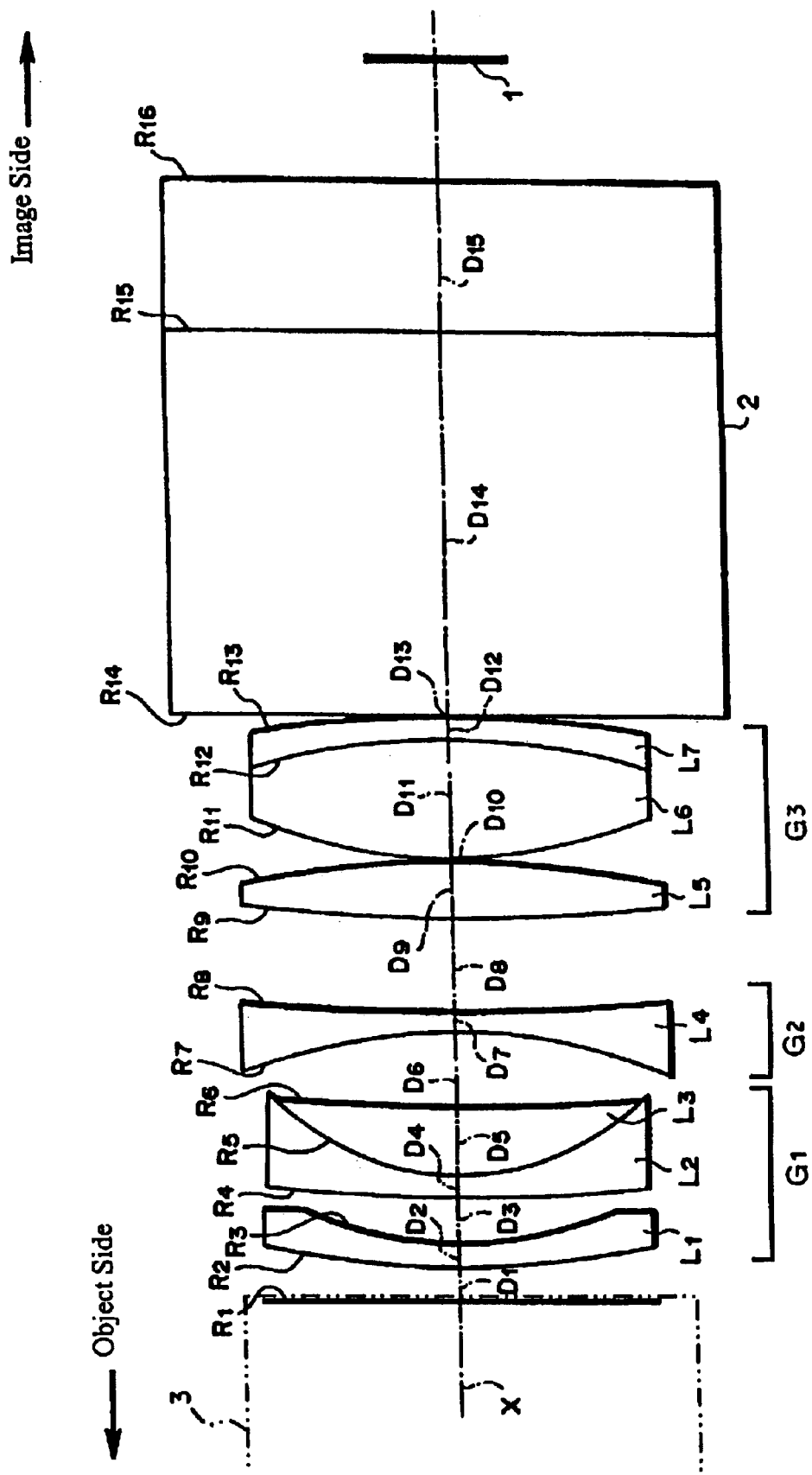
FIG. 2 is a schematic drawing of the basic structure of the extender optical system according to Embodiment 4 of the present invention.
Figure 3A:
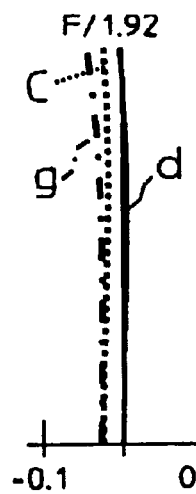
FIGS. 3A–3D show the spherical aberration, astigmatism, distortion, and lateral color, respectively, of a photographic main lens with the extender lens of Embodiment 1 attached.
Figure 3B:
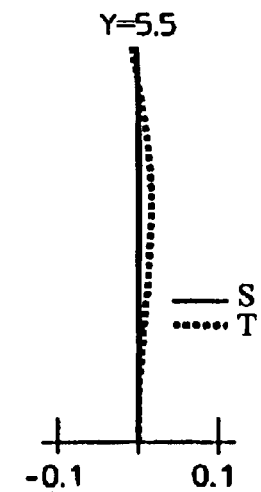
Figure 3C:
Figure 3D:
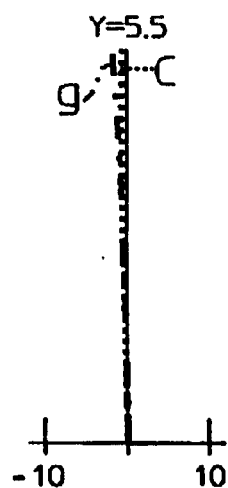
Figure 4A:
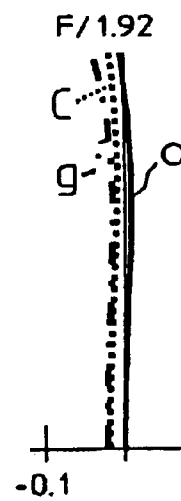
FIGS. 4A–4D show the spherical aberration, astigmatism, distortion, and lateral color, respectively, of a photographic main lens with the extender lens of Embodiment 2 attached.
Figure 4B:
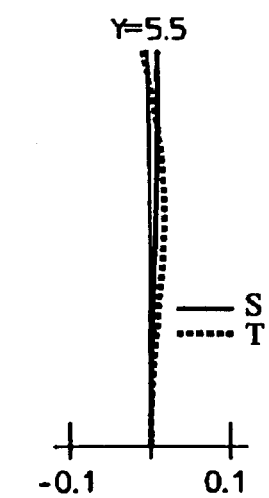
Figure 4C:
Figure 4D:
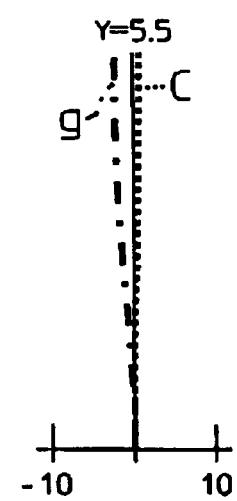
Figure 5A:
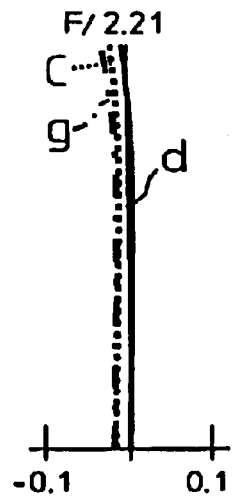
FIGS. 5A–5D show the spherical aberration, astigmatism, distortion, and lateral color, respectively, of a photographic main lens with the extender lens of Embodiment 3 attached.
Figure 5B:
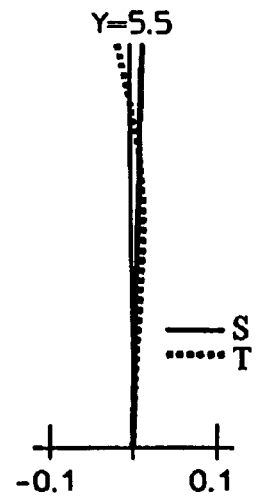
Figure 5C:
Figure 5D:
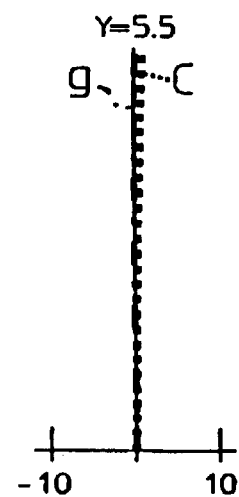
Figure 6A:
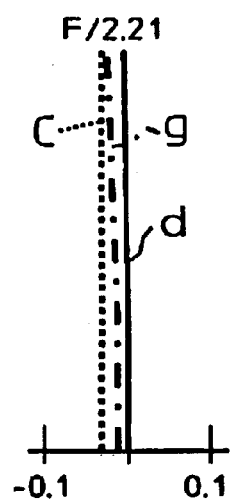
FIGS. 6A–6D show the spherical aberration, astigmatism, distortion, and lateral color, respectively, of a photographic main lens with the extender lens of Embodiment 4 attached.
Figure 6B:
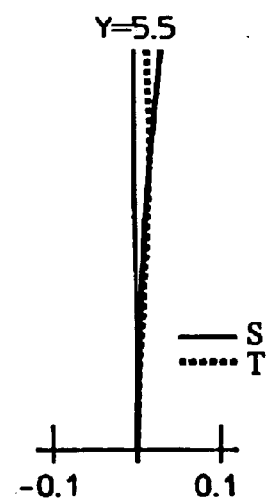
Figure 6C:
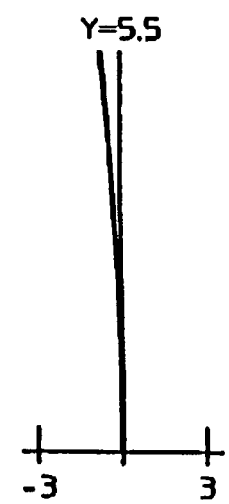
Figure 6D:
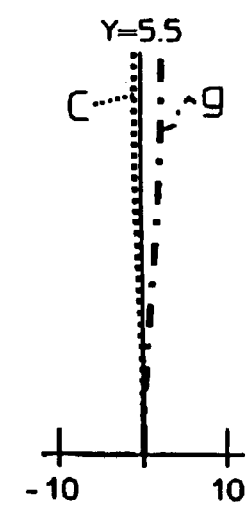

The extender optical system of Embodiment 4, shown in FIG. 2, has almost the same lens element configuration as that of Embodiments 2 and 3. However, in this embodiment, the second lens element L2 has a negative meniscus shape with its concave surface on the image side, and the third lens element L3 has a positive meniscus shape with its concave surface on the image side.

Table 4 below lists the surface number #, in order from the object side (with surface #1 being the image-side surface of the photographic main lens), the radius of curvature R (in mm) of each surface, the on-axis spacing D (in mm) between surfaces, as well as the index of refraction $N_d$ and the Abbe number $v_d$ (both at the d-line) of each optical element of Embodiment 4. Listed in the bottom portion of the table are the image magnification $\beta$ and the back focus Bf (in air).

TABLE 4

| # | R | D | $N_d$ | $v_d$ |
|---|---|---|---|---|
| 1 | ∞ | 3.30 | | |
| 2 | 69.477 | 2.00 | 1.88299 | 40.7 |
| 3 | 29.995 | 4.08 | | |
| 4 | 139.669 | 2.00 | 1.88299 | 40.7 |
| 5 | 19.793 | 5.91 | 1.80517 | 25.4 |
| 6 | 195.899 | 6.77 | | |
| 7 | −40.425 | 1.50 | 1.83400 | 37.1 |
| 8 | 200.508 | 7.87 | | |

TABLE 4-continued

| # | R | D | $N_d$ | $v_d$ |
|---|---|---|---|---|
| 9 | 136.576 | 5.04 | 1.78800 | 47.3 |
| 10 | −69.407 | 0.20 | | |
| 11 | 38.415 | 10.36 | 1.48749 | 70.2 |
| 12 | −49.943 | 2.00 | 1.80809 | 22.8 |
| 13 | −96.262 | 0.00 | | |
| 14 | ∞ | 33.00 | 1.58266 | 46.4 |
| 15 | ∞ | 13.20 | 1.51632 | 64.0 |
| 16 | ∞ | 10.49 | | |

β = 1.500
Bf = 40.05 mm

FIGS. 6A–6D show the spherical aberration, astigmatism, distortion, and lateral color, respectively, of a photographic main lens with the extender lens of Embodiment 4 attached. The spherical aberration is listed for the C, d and g lines, the astigmatism is shown for both the sagittal S and tangential T image surfaces, and the lateral color is shown for the g and C lines (as measured relative to the d-line). The F-number for this embodiment is 2.21 and the maximum image height Y is 5.5 mm. As is apparent from these figures, the various aberrations are favorably corrected for Embodiment 4.

Embodiment 5

The extender optical system of this embodiment has the same general lens element configuration as the extender optical system of Embodiment 2, however, the details (such as the lens element radii of curvature R, the on-axis spacings D and optical materials that are used) are different.

Table 5 below lists the surface number #, in order from the object side (with surface #1 being the image-side surface of the photographic main lens), the radius of curvature R (in mm) of each surface, the on-axis spacing D (in mm) between surfaces, as well as the index of refraction $N_d$ and the Abbe number $v_d$ (both at the d-line) of each optical element of Embodiment 5. Listed in the bottom portion of the table are the image magnification β and the back focus Bf (in air).

TABLE 5

| # | R | D | $N_d$ | $v_d$ |
|---|---|---|---|---|
| 1 | ∞ | 3.30 | | |
| 2 | 207.248 | 2.00 | 1.83400 | 37.1 |

TABLE 5-continued

| # | R | D | $N_d$ | $v_d$ |
|---|---|---|---|---|
| 3 | 27.134 | 5.55 | | |
| 4 | −84.605 | 2.00 | 1.88299 | 40.7 |
| 5 | 23.987 | 6.58 | 1.80517 | 25.4 |
| 6 | −53.794 | 6.70 | | |
| 7 | −33.963 | 1.50 | 1.83400 | 37.1 |
| 8 | 3566.264 | 2.02 | | |
| 9 | 86.802 | 7.02 | 1.81600 | 46.6 |
| 10 | −42.929 | 0.20 | | |
| 11 | 39.895 | 11.45 | 1.48749 | 70.2 |
| 12 | −36.005 | 2.00 | 1.80809 | 22.8 |
| 13 | −95.363 | 0.00 | | |
| 14 | ∞ | 33.00 | 1.58266 | 46.4 |
| 15 | ∞ | 13.20 | 1.51632 | 64.0 |
| 16 | ∞ | 10.49 | | |

β = 1.220
Bf = 40.05 mm

FIGS. 7A–7D show the spherical aberration, astigmatism, distortion, and lateral color, respectively, of a photographic main lens with the extender lens of Embodiment 5 attached. The spherical aberration is listed for the C, d and g lines, the astigmatism is shown for both the sagittal S and tangential T image surfaces, and the lateral color is shown for the g and C lines (as measured relative to the d-line). The F-number for this embodiment is 1.92 and the maximum image height Y is 5.5 mm. As is apparent from these figures, the various aberrations are favorably corrected for Embodiment 5.

In Table 6 below, where reference is made to a Composite Lens or a Main Lens, an idealized photographic main lens is assumed. The idealized main lens has no aberrations and includes a lens for which reverse chromatic aberration correction has been performed in order to correct for aberrations created by a color separation optical system which is assumed to be positioned in the optical path between the main lens and the image surface. Listed in Table 6, for each Embodiment of the invention, are: the image magnification β of the extender optical system, the F-number $F_{NO}$ of the composite lens (i.e., the main lens with extender optical system attached), the air equivalent distance (in mm) from the image surface to the exit pupil of the main lens (+ indicating that the direction is away from the object), the air equivalent distance (in mm) from the image surface to the exit pupil of the composite lens, as well as the values of $N_1$, $N_2$ and $(N_1+N_2)/2$ associated with Condition (3).

TABLE 6

| Embod. No. | β | Composite Lens $F_{NO}$ | Main Lens Exit Pupil | Composite Exit Pupil | $N_1$ | $N_2$ | $(N_1 + N_2)/2$ |
|---|---|---|---|---|---|---|---|
| 1 | 1.289 | 1.924 | +627 | +120 | 1.83480 | 1.83480 | 1.83480 |
| 2 | 1.294 | 1.924 | +627 | +120 | 1.88299 | 1.83400 | 1.85850 |
| 3 | 1.302 | 2.212 | +627 | +120 | 1.88299 | 1.88299 | 1.88299 |
| 4 | 1.500 | 2.212 | +627 | +198 | 1.88299 | 1.88299 | 1.88299 |
| 5 | 1.220 | 1.924 | −260 | +120 | 1.83400 | 1.88299 | 1.85850 |

Table 7 below, for each embodiment, summarizes the values of $N_6$, $v_3$, $v_6$, $v_7$ and $v_6-v_7$ which are the values associated with Conditions (4), (1), (2), (2) and (2), respectively.

TABLE 7

| Embod. No. | $N_6$ | $v_3$ | $v_6$ | $v_7$ | $v_6-v_7$ |
|---|---|---|---|---|---|
| 1 | 1.48749 | 25.4 | 70.2 | 27.5 | 42.7 |
| 2 | 1.48749 | 25.4 | 70.2 | 22.8 | 47.4 |
| 3 | 1.48749 | 25.4 | 70.2 | 22.8 | 47.4 |
| 4 | 1.48749 | 25.4 | 70.2 | 22.8 | 47.4 |
| 5 | 1.48749 | 25.4 | 70.2 | 22.8 | 47.4 |

As is apparent from comparing the values listed in Tables 6 and 7 with Conditions (1)–(5) above, the extender optical system of each Embodiment satisfies the above Conditions (1)–(5).

The extender optical system of the present invention is not limited to the systems described in the Embodiments above. In fact, the number of lens groups, shape and the number of lenses constituting each lens group, and lenses and lens groups to be vibrated may be changed as needed.

The invention being thus described, it will be obvious that the same may be varied in many ways. For example, the number of lens groups, the lens element configuration, the number of lens elements constituting each lens group, and the lenses or lens group(s) to be moved for anti-vibration control may be changed. For example, out of the seven lens elements of the extender optical system described above, while it is preferred that the fifth lens element be a biconvex lens, the other positive lenses may be either biconvex or meniscus in shape, and the negative lens element may be either biconcave or meniscus in shape. Such variations are not to be regarded as a departure from the spirit and scope of the invention. Rather, the scope of the invention shall be defined as set forth in the following claims and their legal equivalents. All such modifications as would be obvious to one skilled in the art are intended to be included within the scope of the following claims.

What is claimed is:

1. An extender optical system, for attachment between a photographic main lens and a main body of a photo apparatus in order to increase the focal length of the lens system as a whole as compared to that of the photographic main lens without the extender optical system attached, said extender optical system comprising, in order from the object side:

a first lens group having an overall negative refractive power and that includes a cemented lens which is formed of, in order from the object side, a negative lens that is cemented to a positive lens element;

a second lens group that consists of a negative lens; and a third lens group having an overall positive refractive power and that includes a cemented lens which is formed of, in order from the object side, a positive lens element that is cemented to a negative lens element;

wherein the following Conditions (1) and (2) are satisfied $$v_{1p} \leq 30 \qquad \text{Condition (1)}$$

$$v_{3p}-v_{3n} \geq 38 \qquad \text{Condition (2)}$$

where $v_{1p}$ is the Abbe number of the positive lens element of the first lens group, $v_{3p}$ is the Abbe number of the positive lens element of the cemented component in the third lens group, and $v_{3n}$ is the Abbe number of the negative lens element of the cemented component in the third lens group.

2. The extender optical system of claim 1, wherein:

the first lens group is formed of, in order from the object side, a first lens having negative refractive power, and a cemented lens which is formed of a second lens of negative refractive power that is cemented to a third lens of positive refractive power and which has surfaces of different curvature, with the surface of stronger curvature on the object side;

the second lens group is formed of, in order from the object side, a negative lens having surfaces of different curvature, and with the surface of stronger curvature on the object side; and the third lens group is formed of, in order from the object side, a fifth lens which is biconvex, and a cemented lens made of a sixth lens element of positive refractive power that is cemented to a seventh lens element of negative refractive power.

3. The extender optical system of claim 2, wherein the following Conditions (3) and (4) are also satisfied:

$$(N_1+N_2)/2 \geq 1.78 \qquad \text{Condition (3)}$$

$$N_6 \leq 1.60 \qquad \text{Condition (4)}$$

where $N_1$ is the refractive index of the first lens element, in order from the photographic main lens;

$N_2$ is the refractive index of the second lens element, in order from the photographic main lens; and $N_6$ is the refractive index of the sixth lens element, in order from the photographic main lens.

4. The extender optical system of claim 2, wherein the following Condition (5) is satisfied:

$$1.15 \leq \beta \leq 1.60 \qquad \text{Condition (5)}$$

where $\beta$ is the image magnification of the extender optical system.

5. The extender optical system of claim 1, wherein the following Conditions (3) and (4) are also satisfied:

$$(N_1+N_2)/2 \geq 1.78 \qquad \text{Condition (3)}$$

$$N_6 \leq 1.60 \qquad \text{Condition (4)}$$

where $N_1$ is the refractive index of the first lens element, in order from the photographic main lens;

$N_2$ is the refractive index of the second lens element, in order from the photographic main lens; and $N_6$ is the refractive index of the sixth lens element, in order from the photographic main lens.

6. The extender optical system of claim 5, wherein the following Condition (5) is satisfied:

$$1.15 \leq \beta \leq 1.60 \qquad \text{Condition (5)}$$

where $\beta$ is the image magnification of the extender optical system.

7. The extender optical system of claim 1, wherein the following Condition (5) is satisfied:

$$1.15 \leq \beta \leq 1.60 \qquad \text{Condition (5)}$$

where $\beta$ is the image magnification of the extender optical system.

8. An extender optical system, which is a lens optical system to be inserted between a photographic main lens and a camera body for changing the focal length of the lens system as a whole to the long focus side, comprising, in order from the object side:

a first lens group having negative refractive power;

a second lens group that consists of a negative lens; and a third lens group having positive refraction power; wherein the negative lens that constitutes the second lens group is made to move in directions that are normal to the optical axis so as to correct for what would otherwise be blurred images due to vibrations.

* * * * *

UNITED STATES PATENT AND TRADEMARK OFFICE
CERTIFICATE OF CORRECTION

PATENT NO. : 6,813,089 B2
DATED : November 2, 2004
INVENTOR(S) : Tsutsumi

It is certified that error appears in the above-identified patent and that said Letters Patent is hereby corrected as shown below:

Column 3,
Line 44, change "G1of" to -- G1 of --;
Line 47, change "G3of" to -- G3 of --;
Line 49, change "G1is" to -- G1 is --;
Line 57, change "G2is" to -- G2 is --;
Line 58, change "is concave" to -- its concave --;
Line 59, change "G3is" to -- G3 is --;
Line 65, change G2using" to -- G2 using --;

Column 4,
Line 35, change "(5), which" to -- (5)), which --;

Column 5,
Line 13, change "G2is" to -- G2 is --; and

Column 11,
Line 8, change "refraction power" to -- refractive power --.

Signed and Sealed this

Twenty-second Day of February, 2005

JON W. DUDAS
*Director of the United States Patent and Trademark Office*